(12) United States Patent  (10) Patent No.: US 6,270,282 B1
McLaughlin  (45) Date of Patent: Aug. 7, 2001

(54) TORQUE ROD APEX MOUNT

(75) Inventor: Ronald J. McLaughlin, Maumee, OH (US)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/348,152

(22) Filed: Jul. 6, 1999

(51) Int. Cl.$^7$ .................................................. B60G 15/00
(52) U.S. Cl. ................. 403/158; 280/86.75; 280/124.11; 180/352
(58) Field of Search .................................... 403/150, 152, 403/157, 158, 289, 290; 280/86.75, 86.757, 124.11, 124.116; 180/352, 378, 349

(56) References Cited

U.S. PATENT DOCUMENTS

| 2,299,900 | 10/1942 | Jackson . | |
|---|---|---|---|
| 2,300,844 | 11/1942 | Olley . | |
| 2,319,430 | 5/1943 | Olley et al. . | |
| 2,323,007 | 6/1943 | Borgward . | |
| 2,746,766 | 5/1956 | Nallinger . | |
| 3,007,715 | * 11/1961 | Maharick | 280/124.116 |
| 3,768,829 | 10/1973 | Colovas et al. . | |
| 4,466,636 | * 8/1984 | Cornacchia et al. | 280/124.116 |
| 4,804,205 | 2/1989 | Parsons . | |
| 4,900,057 | * 2/1990 | Raidel | 280/86.75 |
| 5,037,125 | 8/1991 | Zamitter et al. . | |
| 5,366,035 | 11/1994 | Hayashida et al. . | |
| 5,458,359 | * 10/1995 | Brandt | 280/86.757 X |
| 5,524,921 | * 6/1996 | Ellingsen | 280/86.75 X |
| 5,564,521 | 10/1996 | McLaughlin et al. . | |
| 6,042,131 | * 3/2000 | Bailey | 280/86.75 |

* cited by examiner

Primary Examiner—Lynne H. Browne
Assistant Examiner—David E. Bochna
(74) Attorney, Agent, or Firm—Harness, Dickey & Pierce, PLC

(57) ABSTRACT

A V-configuration torque rod has an apex pivotal joint system which includes a pair of pivotal end joint assemblies connected by a bar-pin journal. The bar-pin journal is bent as an angle to define the V-configuration of the torque rod. By using the bent bar-pin journal, straight links for the arms of the V-configuration can be utilized using similar components at each end joint assembly.

14 Claims, 2 Drawing Sheets

TORQUE ROD APEX MOUNT

FIELD OF THE INVENTION

The present invention is related to torque rod assemblies for use in suspension systems for trucks, buses and the like. More particularly, the present invention is related to an improved apex pivotal joint system for the torque rod assemblies.

BACKGROUND OF THE INVENTION

Truck and bus suspensions utilize at least one torque rod to secure the drive axle to the vehicle's frame. The securing of the drive axle to the vehicle's frame by the torque rod maintains the drive axle's alignment to the vehicle's frame, it maintains the proper suspension geometry for the vehicle, and it allows free suspension movements in jounce and rebound for all terrain, road and driving conditions. Because of the wide range of dynamic operating conditions for these vehicles, especially heavy duty trucks, the severe impact loads to the suspension system combined with the road induced vibrations on the suspension system lead to a deleterious effect on the individual suspension components including the torque rods as well as having a negative impact on the operator's physical fatigue condition. These severe dynamic conditions can accelerate wear of the torque rods of the suspension system leading to premature failures of these torque rods.

The purpose of torque rods on large vehicles is to stabilize the axle. They prevent the axle from rotating about its axis; they prevent the axle for moving fore and aft during braking and acceleration; and they prevent axle yaw. While there are a variety of suspension designs, one of two approaches are generally used to stabilize the axle. The first approach uses straight rods with pivotal joints at either end. Two of these straight rods are mounted fore and aft on the vehicle; where one end is mounted to the axle and the other end is mounted to the frame. A third straight rod is similarly mounted laterally in the vehicle, generally perpendicular to the other two. The second approach is a V-configuration torque rod assembly. This type of torque rod has a pivotal joint mounted at the apex of the V as well as at the ends of the legs. The apex is mounted to the axle, and the legs are mounted to the frame. The V-configuration controls both fore-aft movement as well as lateral movement. The major advantage of the V-configuration rod assembly is axle stability.

A typical prior art single or V-configuration rod is comprised of two or three pivotal joint eyelet forgings rigidly connected with tubes to provide the mechanical integrity. The eyelets and tubes form a natural path for shock and vibration energy to transfer from the suspension system into the frame, the cab and other areas of the sprung mass of the vehicle. In order to intercept this path, attempts have been made to incorporate an isolation function into the pivotal joint design. This isolation function thus makes the pivotal joint a critical multi-functional component for the torque rod assembly as well as the suspension system as a whole.

Current pivotal joint designs are based on at least one of two product principles. The first is that the designs incorporate flexible elastomeric bushings and the second is that the designs incorporate metal on metal or metal/plastic components. Both of these designs have their individual advantages but because of their performance capability limitations, neither one encompasses the needed combination of noise, vibration and harshness (NVH) isolation capability; torsional or oscillatory freedom; and lateral spring rate control. Each of these three characteristics are essential elements for the optimum isolation while maintaining the necessary vehicle handling and stability. All three characteristics have a significant impact on NVH and handling properties thus leading to a significant affect on the operator's physical condition. The pivotal joint designs that incorporate a flexible elastomeric bushing are known for their good isolation capability but their inherent flexibility may compromise the stability that can be provided by a rigid joint at the apex of a V-configuration rod. In addition, the limited torsional oscillatory angle capability of the flexible elastomeric bushing and the inherent zero point of the torsional spring complicates the installation of torque rods having this type of pivotal joint. The pivotal joint designs that incorporate rigid metal or metal/plastic ball joint pivots are based on the sliding bearing product principle. Although the sliding bearing principle provides suspension freedom in the vertical plane and requires a relatively simple installation process, the bearing's rigidity limits its isolation capability. Consequently, it acts as a conduit for road induced impact and vibrations into the frame and eventually into the cab. Other disadvantages of the rigid metal or metal/plastic designs is that they consist of numerous costly semi precision bearing components requiring expensive boot seals that are vulnerable to wear, tear, exterior cuts and the like. In addition, the sliding bearing designs require periodic maintenance and lubrication.

In the V-configuration (three pivot joint designs), the most critical component is the apex pivotal joint which is normally positioned on the drive axle. This apex pivotal joint design is critical because it is subjected to double the load of the individual arm or frame connection pivots; it is subjected to greater conical displacement than the frame connection pivots; it is the closest to the source of road induced impacts, tire noise and vibration in general; and its fore and aft and lateral mode spring rate ratio affects the pivotal joint's isolation effectiveness and vehicle stability.

The continued development of pivotal joints for suspension components, and especially the apex pivotal joint, has been directed towards designing pivotal joints which are able to maximize their isolation capabilities while simultaneously maximizing the stability provided by the pivotal joint.

SUMMARY OF THE INVENTION

The present invention provides the art with an apex pivotal joint system that provides an improved performance along with a high load carrying capability. The apex pivotal joint system of the present invention is more economical and more effective at isolating vibrations. The apex pivotal joint system comprises two basic pivot joint assemblies that share a common internal L-shaped member. The L-shaped member positions the two pivot joints such that the central axes of the legs pass through the bushing end meeting at the apex.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
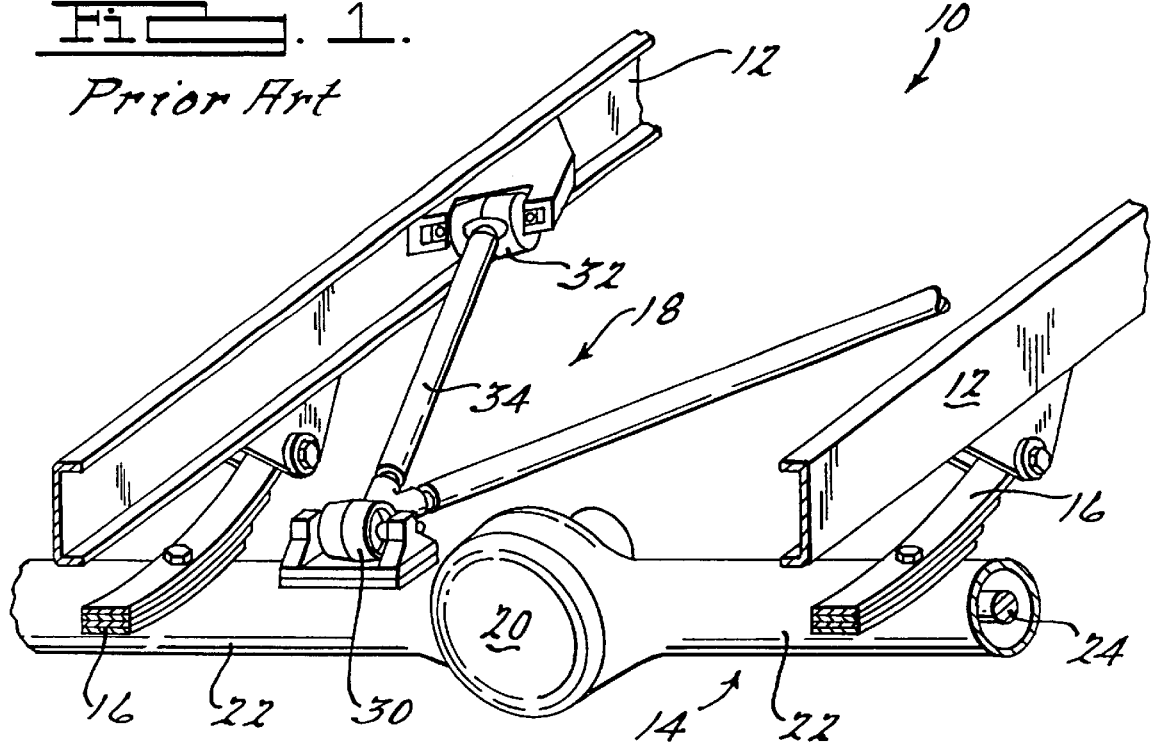
FIG. 1 is a partial perspective view of a typical truck or bus rear suspension having a prior art V-configuration torque rod.

Referring now to the drawings in which like reference numerals designate like or corresponding parts throughout the several views, there is shown in FIG. 1 a prior art truck or bus rear suspension indicated generally by the reference numeral 10. Rear suspension 10 comprises a frame 12, a drive axle 14, a pair of springs 16 and a V-configuration torque rod 18. Frame 12 supports a body (not shown) and other components of the vehicle which are termed the sprung mass. Drive axle 14 includes a differential 20 which receives torque from an engine (not shown) through a prop shaft (not shown). Drive axle 14 also includes a pair of hollow tubes 22 that each extend out to a respective wheel assembly (not shown). Disposed within each tube 22 is a drive shaft 24 that extends to a hub (not shown) to which is attached to a wheel (not shown). The engine transmits torque to differential 20 though the prop shaft. Differential 20 transfers the torque from the prop shaft to drive shafts 24 to rotate and thus drive the wheels. Springs 16 are disposed between frame 12 and drive axle 14 as is well known in the art. Additionally, a shock absorber (not shown) can be disposed between frame 12 and drive axle 14 to damper the motion between these two components. Torque rod 18 is also disposed between frame 12 and drive axle 14 to control the motion of drive axle 14 with respect to frame 12.

Figure 2:
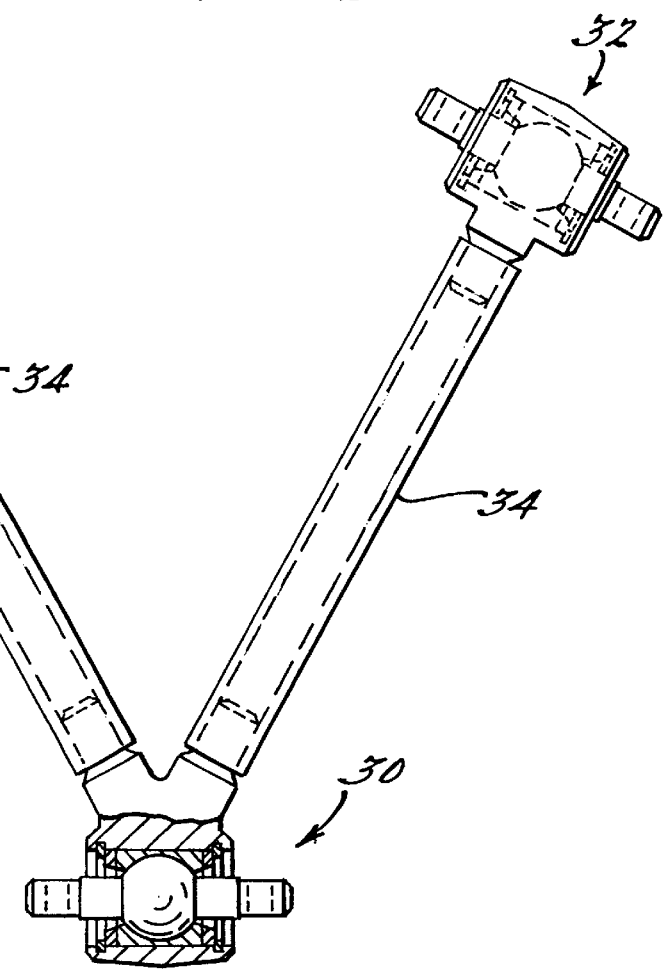
FIG. 2 is a plan view, partially in cross-section, illustrating the prior art V-configuration torque rod shown in FIG. 1.

Referring now to FIG. 2, V-configuration torque rod 18 comprises an apex pivotal joint assembly 30, a pair of end pivotal joint assemblies 32 and a pair of tubes 34. Each tube 34 extends between apex pivotal joint assembly 30 and a respective end pivotal joint assembly 32. Apex pivotal joint assembly 30 and end pivotal joint assemblies 32 are secured to tubes 34 by welding or by other means known well in the art.

Figure 3:
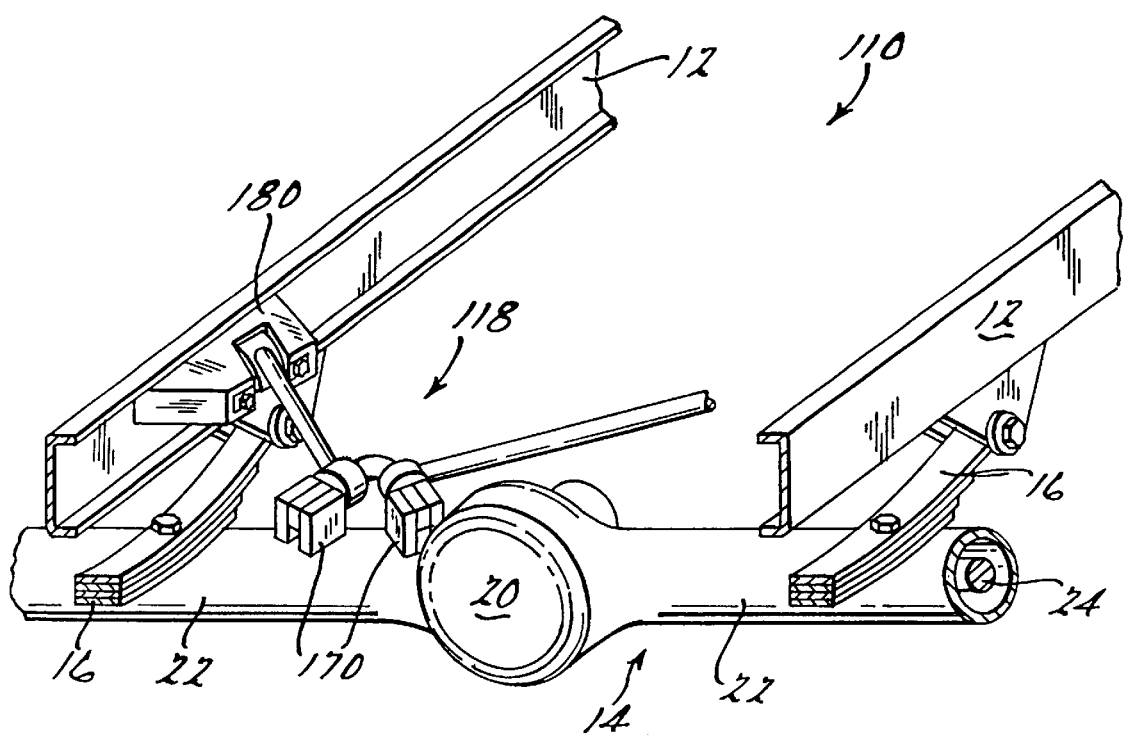
FIG. 3 is a partial perspective view of a typical truck or bus rear suspension having a V-configuration torque rod incorporating the unique apex pivotal joint system in accordance with the present invention.

Referring now to FIG. 3, a truck or bus rear suspension is illustrated incorporating the unique apex pivotal joint system constructed in accordance with the present invention and it is designated generally by the reference numeral 110. Rear suspension 110 comprises frame 12, drive axle 14, the pair of springs 16 and a V-configuration torque rod 118. Rear suspension 110 is thus the same as rear suspension 10 but it replaces torque rod 18 with torque rod 118.

Figure 4:
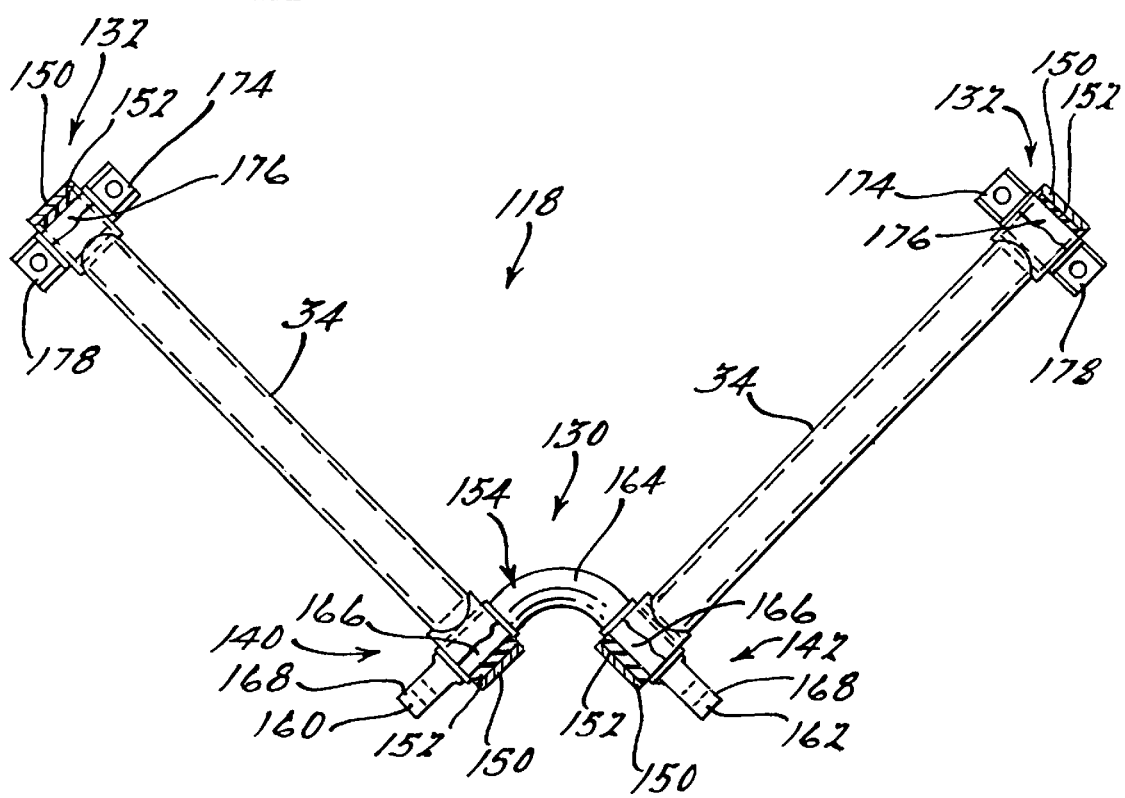
FIG. 4 is a plan view, partially in cross-section illustrating a unique V-configuration torque rod in accordance with the present invention.

Referring now to FIG. 4, V-configuration torque rod 118 comprises an apex pivotal joint system 130, a pair of end pivotal joint assemblies 132 and the pair of tubes 34. Each tube 34 extends between apex pivotal joint system 130 and a respective end pivotal joint assembly 132. Apex pivotal joint system 130 and end pivotal joint assemblies 132 are secured to tubes 34 by welding or by other means known in the art.

Apex pivotal joint system 130 comprises a first pivot joint assembly 140 and a second pivot joint assembly 142. Pivot joint assembly 140 comprises an eyelet 150, a bushing 152 and a bar-pin journal or an inner member 154. In a similar manner, pivot joint assembly 142 comprises an eyelet 150, a bushing 152 and inner member 154.

Inner member 154 is a generally L-shaped member which is bent at a desired angle for V-configuration torque rod 118. Inner member 154 defines a first machined end 160 which forms part of pivot joint assembly 140 and a second machined end 162 which forms part of pivot joint assembly 142. Ends 160 and 162 are attached by a central portion 164. Each machined end 160 and 162 included a formed diameter 166 which mates with bushing 152 and a generally rectangular section 168 which is utilized to mount V-configuration torque rod 118 to drive axle 14 using a bracket 170 as shown in FIG. 3.

End pivotal joint assemblies 132 each comprise an eyelet 150, a bushing 152 and an inner member 174. Inner member 174 is a generally straight bar which defines a formed diameter 176 which mates with bushing 152 and a pair of generally rectangular sections 178 which are utilized to mount V-configuration torque rod 118 to frame 12 using a bracket 180 as shown in FIG. 3.

The assembly of V-configuration torque rod 118 includes the steps of machining both ends of tubes 34 such that they conform to the outside diameter of eyelets 150. Pre-formed eyelets 150 are then welded to each end of tubes 34. Pre-formed inner member 154 and inner members 174 are assembled to a respective bushing 152 and bushing 152 is bonded to members 154 and 174. One member 174 and bushing 152 are assembled into a respective eyelet 150 by compressing bushing 152 while assembling bushing 152 within eyelet 150. The specific dimensions of eyelet 150 and bushing 152 assembled onto member 174 will determine the percent compression for bushing 152. The second member 174 and bushing 152 are assembled into a respective eyelet 150 in a similar manner as the first. Finally, member 154 and its two bushings 152 are assembled into their two respective eyelets 150. This assembly of members 154 and 174, bushings 152 and eyelets 150, can be done individually, in groups, or all of them can be assembled simultaneously. While the above description has bushing 152 being assembled with members 154 and 174 and then inserted into eyelets 150, it is within the scope of the present invention to first assemble bushings 152 into eyelets 150 and then insert members 154 and 174 if desired. While torque rod 118 is being shown for exemplary purposes as a welded tubular assembly, it is within the scope of the present invention to manufacture torque rod 118 as a casting, a forging, a weldment, a headed member, a polymer or any other type of construction known in the art.

V-configuration torque rod 118 offers numerous advantages for the manufacturers. One advantage is the commonization of components between end pivotal joint assemblies 132 and apex pivotal joint system 130. While it is not a requirement that all of these components be the same or similar, the design offers the opportunity to make them the same. Another advantage is that by mounting torque rod 118 such that the central axis of each leg spacer passes through the bushing at the apex, a significant reduction in the stresses in the metal components is realized. Stresses in the metal components can be reduced by as much as 70%. In addition, this design minimizes the lateral loads on the bushings and significantly diminishes the lateral movement of the bushings.

While the above detailed description describes the preferred embodiment of the present invention, it should be understood that the present invention is susceptible to modification, variation and alteration without deviating from the scope and fair meaning of the subjoined claims.

What is claimed is:

1. A torque rod comprising:
   a first end joint assembly;

a first bar secured to said first end joint assembly;

a second end joint assembly; and a second bar secured to said second end joint assembly;

an apex pivotal joint system secured to said first and second bars, said apex pivotal joint system comprising:

a first eyelet defining a first bore;

a first bushing disposed within said first bore of said first eyelet;

a second eyelet defining a second bore;

a second bushing disposed within said second bore of said second eyelet; and a bar-pin journal disposed within both of said first and second bushings, said bar-pin journal having a first end disposed adjacent said first bushing and a second end disposed adjacent said second bushing, said first and second ends being separately attached to a drive shaft of a vehicle.

2. The torque rod according to claim 1, wherein said first end comprises a first formed end, said second end comprises a second formed end and said bar-pin journal further comprises a central portion disposed between said first and second formed ends.

3. The torque rod according to claim 2, wherein said central portion is a generally L-shaped member.

4. The torque rod according to claim 1, wherein a longitudinal axis of said first bar passes through said first bushing.

5. The torque rod according to claim 4, wherein said longitudinal axis of said first bar passes through a center of said first bushing.

6. The torque rod according to claim 4, wherein a longitudinal axis of said second bar passes through said second bushing.

7. The torque rod according to claim 6, wherein said longitudinal axis of said first bar passes through a center of said first bushing and said longitudinal axis of said second bar passes through a center of said second bushing.

8. A V-configuration torque rod defining an included angle, said torque rod comprising:

first end joint assembly;

a first bar secured to said first end joint assembly;

a second end joint assembly; and a second bar secured to said second end joint assembly;

an apex pivotal joint system secured to said first and second bars, said apex pivotal joint system comprising:

a first eyelet defining a first bore;

a first bushing disposed within said first bore of said first eyelet;

a second eyelet defining a second bore;

a second bushing disposed within said second bore of said second eyelet; and a bar-pin journal disposed within both of said first and second bushings, said bar-pin journal defining said included angle, said bar-pin journal having a first end disposed adjacent said first bushing and a second end disposed adjacent said second bushing, said first and second ends being seperately attached to a drive shaft of a vehicle.

9. The torque rod according to claim 8, wherein said first end comprises a first formed end, said second end comprises a second formed end and said bar-pin journal further comprises a central portion disposed between said first and second formed ends.

10. The torque rod according to claim 9, wherein said central portion is a generally L-shaped member.

11. The torque rod according to claim 8, wherein a longitudinal axis of said first bar passes through said first bushing.

12. The torque rod according to claim 11, wherein said longitudinal axis of said first bar passes through a center of said first bushing.

13. The torque rod according to claim 11, wherein a longitudinal axis of said second bar passes through said second bushing.

14. The torque rod according to claim 13, wherein said longitudinal axis of said first bar passes through a center of said first bushing and said longitudinal axis of said second bar passes through a center of said second bushing.

* * * * *

UNITED STATES PATENT AND TRADEMARK OFFICE
CERTIFICATE OF CORRECTION

PATENT NO. : 6,270,282 B1  
DATED : August 7, 2001  
INVENTOR(S) : Ronald J. McLaughlin It is certified that error appears in the above-identified patent and that said Letters Patent is hereby corrected as shown below:

<u>Title page,</u>  
Item [57], ABSTRACT,  
Line 5, delete "as" and substitute -- is -- therefor <u>Column 3,</u>  
Line 28, delete "shafts" and substitute -- shaft -- therefor Signed and Sealed this Twenty-fifth Day of June, 2002

Attest:

JAMES E. ROGAN  
*Attesting Officer*   *Director of the United States Patent and Trademark Office*

UNITED STATES PATENT AND TRADEMARK OFFICE
CERTIFICATE OF CORRECTION

PATENT NO.    : 6,270,282 B1                                    Page 1 of 1
DATED         : August 7, 2001
INVENTOR(S)   : Ronald J. McLaughlin It is certified that error appears in the above-identified patent and that said Letters Patent is hereby corrected as shown below:

<u>Title page,</u>
Item [73], Assignee, delete "Denso corporation, Kariya, JP" and substitute
-- The Pullman Company, Milan, Ohio --.

Signed and Sealed this

Eighteenth Day of February, 2003

JAMES E. ROGAN
*Director of the United States Patent and Trademark Office*